United States Patent [19]

Ernest et al.

[11] 4,451,441
[45] May 29, 1984

[54] METHOD FOR EXHAUST GAS TREATMENT

[75] Inventors: Michael V. Ernest, Baltimore; James M. Maselli, Columbia, both of Md.

[73] Assignee: W. R. Grace & Co., New York, N.Y.

[21] Appl. No.: 523,511

[22] Filed: Sep. 9, 1983

Related U.S. Application Data

[60] Division of Ser. No. 394,220, Jun. 21, 1982, Pat. No. 4,426,320, which is a continuation of Ser. No. 228,832, Jan. 27, 1981, abandoned.

[51] Int. Cl.³ .............................................. B01D 53/36
[52] U.S. Cl. .................................. 423/213.2; 423/212; 423/213.7; 423/215.5; 502/313; 502/527; 60/311; 55/487; 55/DIG. 30
[58] Field of Search ............... 423/213.5, 213.7, 215.5, 423/212 C, 212; 55/487, 523, DIG. 30; 502/409 US, 439 US, 313 US, 527 US; 60/311

[56] References Cited

U.S. PATENT DOCUMENTS 4,032,124  6/1977  Yarwood et al. .................... 266/218

FOREIGN PATENT DOCUMENTS 641399   8/1950   United Kingdom .
808806   2/1959   United Kingdom .
1014498  12/1965  United Kingdom ............. 423/213.2
1412142  10/1975  United Kingdom .
1450389  9/1976   United Kingdom .
1462993  1/1977   United Kingdom .
2035835  6/1980   United Kingdom ......... 55/DIG. 30

Primary Examiner—Earl C. Thomas
Assistant Examiner—Jeffrey E. Russel
Attorney, Agent, or Firm—Edward J. Cabic

[57] ABSTRACT

Suspended particles in exhaust gases, such as carbon and lead particles in internal combustion engine exhaust gases, are removed by passing the gases through a coarse filter and then through a fine filter. The filters may comprise a ceramic foam material and a catalyst material effective for the conversion of the carbon particles and/or gaseous pollutants in the exhaust gases to innocuous entities may be deposited on the filters.

5 Claims, No Drawings

METHOD FOR EXHAUST GAS TREATMENT

This is a division of application Ser. No. 394,220 filed June 21, 1982, now U.S. Pat. No. 4,426,320, which is a continuation of application Ser. No. 228,832, filed Jan. 27, 1981, now abandoned.

This invention relates to exhaust gas treatment and, more particularly, to the removal of suspended lead and carbon particles and gaseous pollutants from internal combustion engine exhaust gases.

Filters have been used to remove suspended solids from exhaust gases such as the lead and carbon particles in internal combustion engine exhaust gases. As particles accumulate in the filter, the resulting restriction of exhaust gas flow increases the back pressure and reduces filtration and engine efficiency. In order to restore normal operation, the filter must be periodically regenerated, for example, by mechanically cleaning the filter or by heating it and combusting the trapped carbon particles.

Diesel particulate emissions are evidenced by the occasional visible smoke discharges that occur during acceleration or maximum power operation. The large quantities of the very small and light carbon particles in diesel exhaust gases present substantial difficulties in achieving a high degree of particulate removal and avoiding excessive back pressure.

In accordance with the method of this invention, carbon and lead particles are removed from internal combustion engine exhaust gases by passing the gases through a coarse filter and then through a fine filter. The filters comprise a refractory material effective to trap the particles. The use of a fine filter permits trapping of a high percentage of the particles and substantially reduces particulate emissions. The use of a relatively coarse filter to remove larger particles before the gases reach the second fine filter extends the useful life of the fine filter and reduces the rate at which the back pressure increases as the particles accumulate in the filters. The selective filtration and particulate trapping distribution of this invention thus provide high trapping efficiency with low increases in back pressure and effective filtration for longer periods before regeneration is required.

The composition of this invention for converting one or more pollutants in an exhaust gas to innocuous entities and removing suspended particles from the gas comprises a catalyst material effective for the conversion deposited on a coarse filter and on a fine filter. The filters comprise a refractory material effective to trap the particles in the gas and are positioned so that the gas flows in succession through the coarse filter and the fine filter. When the catalyst material is effective for the conversion of carbon and gaseous pollutants in the exhaust gases, the oxotherm from the conversion of gaseous pollutants occurs in the fine filter because of low conversion resulting from mass transfer limitations in the coarse filter. The exotherm enhances combustion of carbon particles trapped in the fine filter and regeneration of the filtration capacity.

The filters may comprise any material which is effective for trapping the particles in the gases, for example, as a result of inertial impact or electrostatic attraction. The filters are generally made of a porous, refractory material which is resistant to the temperatures of the gases and of catalytic conversion of the pollutants. Suitable materials which have affinity for the particles and to which the particles adhere include refractory ceramic or metallic materials which have sufficient thermal and mechanical stability for use in a catalytic reactor. The metal may be, for example, steel, stainless steel, aluminum, copper, or nickel. The ceramic material may be a refractory metal oxide, such as alumina, silica, magnesia, zirconia, titania, chromia, or combinations thereof such as cordierite or a refractory metal silicate or carbide.

The filters may be in the form of refractory inorganic oxide beads, such as ceramic spheres or cylinders. Preferably, the filters are unitary structures of relatively large size such as ceramic monoliths, metal wools, or metal meshes. An open cell filter structure having a plurality of interconnected voids is especially preferred. The continuous cells of such a structure provide convoluted gas flow paths so that there is a greater probability that a particle will be trapped and not pass through the filter. This structure has a larger particulate retention capacity and higher filtration efficiency than other filters.

An especially preferred filter having a continuous cellular structure is a ceramic foam. In addition to larger particulate retention capacities and higher filtration efficiencies, ceramic foams are particularly useful in the treatment of diesel exhaust emissions because of their lower pressure loss, higher self-agitation, larger geometrical surface area, and lower density than ceramic monoliths and other filters having laterally extending flow paths. The foams also have substantial resistance to heat and chemical and physical degradation.

The ceramic foam filter preferably used in the present invention is prepared from an open cell, flexible foam material having a plurality of interconnected voids surrounded by a web of the flexible foam material, such as a polyurethane foam or cellulosic foam. The foam material is impregnated with an aqueous ceramic slurry so that the slurry coats the web. The coated foam is dried and heated to burn out the organic foam and sinter the ceramic coating. The product is a fused ceramic foam having a plurality of interconnected voids surrounded by a web of bonded or fused ceramic in the configuration of the organic foam. Suitable cordierite foams of various cell sizes are commercially available from Bridgestone Tire Co., Ltd., Tokyo, Japan and may be prepared in accordance with the method described in Japanese Kokai 77/77,114, published June 29, 1977. Other ceramic foams which are suitable for use in this invention are described in U.S. Pat. Nos. 3,893,917 and 3,962,081.

The degree to which the filter permits the passage of particles suspended in exhaust gases or traps them depends upon the void volume or porosity and the pore size of the filter. The porosity of the filter may comprise voids in a unitary structure or voids between individual components of a particulate filter medium, such as ceramic beads. The pore size and porosity of the filters used in this invention may be varied to suit the particular gases being filtered. The filters generally have a pore size of from about 2 to about 50 pores per 25 millimeters in length. Generally, the filters have a porosity, i.e., a void volume, of from about 80 to about 95 percent of the total volume occupied by the filter. The porosity is obtained from measurements of the specific gravity of the filter material and the bulk specific gravity using the formula $$\text{porosity (\%)} = \frac{\text{weight of filter}}{\text{specific gravity of filter material} \times \text{volume of filter} \times 100}$$

Suitable filters also generally have an air permeability of from about 400 to about $8000 \times 10^{-7}$ square centimeters.

The coarse filter is located upstream in the flow of the gases through the composition and the fine filter is located downstream from the coarse filter in the flow of gases through the composition. The fine filter has a greater number of cells per unit length and a smaller cell size than the coarse filter. The respective pore sizes and permeabilities may vary in accordance with the particular nature of the gas under treatment. The cell sizes of each filter are selected to optimize the relative degree of particulate trapping in each of the filters and distribute the trapped particles between the filters so that the pressure drop is minimized while good trapping efficiency is maintained. The upstream filter generally has a relatively coarse pore size from about 2 to about 20 pores per 25 millimeters in length and an air permeability of from about 2500 to about $8000 \times 10^{-7}$ square centimeters. The downstream relatively fine filter generally has a pore size of from about 15 to about 50 pores per 25 millimeters in length and an air permeability of from about 400 to about $2500 \times 10^{-7}$ square centimeters. Preferably, the coarse filter has from about 6 to about 20 pores per 25 millimeters in length and the fine filter has from about 17 to about 30 pores per 25 millimeters in length.

Multiple coarse filters of the same or different cell sizes may be employed in combination with multiple fine filters of the same or different cell sizes to vary the selective filtration and balance the pressure loss and trapping efficiency needed for a particular gas treatment application.

A catalyst material may be deposited on the filters. The catalyst material is a catalytically active metal or metal compound that is effective for the conversion of one or more pollutants in the exhaust gases to innocuous entitles. The pollutants may be the particulate and/or gaseous pollutants present in the exhaust gases. Generally, the catalyst material is an oxidation catalyst. In internal combustion engine exhaust gas treatment, the catalyst material may be effective for the combustion of carbon particles. Suitable carbon combustion catalyst materials include an element of the first transition series, silver, hafnium, and mixtures thereof. As used in this application, the elements of the first transition series are vanadium, chromium, manganese, iron, cobalt, nickel, copper, and zinc. The material may be present in the form of the metal, metal oxide, mixed metal oxide, such as copper chromite or a perovskite, or other catalytically-active metal compounds. Copper oxide and chromium oxide are preferred.

When used in the treatment of internal combustion engine exhaust gases, the catalyst material is preferably also effective for the conversion of hydrocarbons, carbon monoxide, and/or nitrogen oxide pollutants. Such catalyst materials include a noble metal, an element of the first transition series, and mixtures thereof. The noble metals are gold, silver, and the platinum group metals are platinum, palladium, rhodium, ruthenium, iridium, and osmium. The material may be in the form of the metal, the metal oxide, or other catalytically active compounds of the metal.

Platinum, palladium, and chromium oxide are preferred because of their high hydrocarbon oxidation activity at relatively low temperatures. Chromium oxide is highly preferred because it also is especially effective in the combustion of diesel exhaust carbon particles. In an especially preferred embodiment of this invention, the catalyst material comprises a platinum group metal such as platinum, palladium, or mixtures thereof and chromium oxide. The combination of the platinum group metal and chromium oxide catalyzes carbon combustion at a significantly lower temperature than either component alone.

The catalyst material may be deposited on the filters in any desirable manner from aqueous or organic solutions of a metal compound or complex or slurries of the metal or metal oxide. Generally, deposition of this component is effected by impregnating the filter with an aqueous solution of a water soluble, thermally decomposable inorganic salt or complex of the particular metal or metals and drying the impregnated filter at a temperature of from about 90° to about 250° C. for about 2 to about 20 hours. The dried filter may then be calcined at a temperature of from about 300° to about 700° C. for about 1 to about 3 hours. The calcination can be conducted in air or other oxidizing gases or in a reducing gas such as hydrogen if the metal form of the catalyst is desired. Typical thermally decomposable water soluble metal compounds include the acetate, chloride, and nitrate. Preferably, the platinum group metal component is deposited in the form of a sulfito complex as described in U.S. Pat. No. 3,850,847 of Graham et al. to enhance its dispersion and surface area.

If a surface area higher than that of the filter is desired, the catalyst material may be supported on a porous, refractory inorganic oxide. These oxides have a high total pore volume and surface area. Generally, the surface area of the refractory oxide is at least about 75 square meters per gram, preferably from about 100 to about 300 square meters per gram, and the total pore volume is at least about 0.4 cubic centimeters per gram, preferably from about 0.5 to about 2.0 cubic centimeters per gram. The surface areas referred to throughout this specification are determined by the nitrogen BET method. The total pore volumes are determined by adding water to a powder sample to the point where incipient wetness just occurs.

Generally, the refractory oxide is composed predominantly of oxides of one or more metals of Groups II, III, and IV having atomic numbers not exceeding 40. Suitable porous refractory inorganic oxides can be prepared by dehydrating, preferably substantially completely, the hydrate form of the oxide by calcination generally at temperatures of about 150° to about 800° C. for periods of from about ½ to about 6 hours. The preferred refractory oxide is a transitional alumina, such as chi, rho, kappa, gamma, delta, eta, and theta aluminas, especially gamma alumina. A particularly preferred gamma alumina may be prepared by calcining a boehmite-pseudoboehmite intermediate alumina prepared in accordance with U.S. Pat. No. 4,154,812 of Sanchez et al. at a temperature of about 650° C. for about 1 hour. Other suitable oxides include, for example, calcined beryllia, zirconia, magnesia, and mixtures of metal oxides such as boria-alumina, silica-alumina, and the like.

In a highly preferred embodiment of this invention, the catalyst material comprises the diesel exhaust catalyst composition of U.S. patent application Ser. No. 153,502, filed May 27, 1980, by Ernest and Welsh, entitled "Composite Diesel Exhaust Catalyst" and now U.S. Pat. No. 4,303,552. This catalyst comprises a mixture of catalytically-effective amounts of at least one material selected from the group consisting of a noble metal, chromium, and catalytically-active compounds thereof supported on a porous refractory inorganic oxide and at least one bulk material selected from the group consisting of an element of the first transition series, silver, hafnium, and catalytically-active compounds thereof. The catalyst material may comprise a mixture of from about 40 to about 60 weight percent of a supported material comprising a platinum group metal, chromium oxide, or mixtures thereof supported on a transitional alumina and from about 40 to about 60 weight percent of a bulk material comprising copper oxide. The bulk material may be prepared by thermal decomposition of a compound of the desired metal. Typically, the acetate, nitrate, carbonate, hydroxide, or chloride is heated at a temperature of from about 450° to about 800° C. for a period of from 1 to about 5 hours. The bulk material is slurried with the supported material and deposited on the filters.

The refractory oxide may be coated on the filter and then the catalyst material deposited on the filter. Preferably, however, the catalyst material is deposited on the refractory oxide and then the supported catalyst is deposited on the filter. For example, a suitable catalytic component may be added to an aqueous slurry of the oxide and the mixture deposited on the filter by conventional methods, such as dipping or spraying.

The coated filter is then dried at a temperature of from about 90° C. to about 250° C. for about 1 to about 4 hours to remove the solvent and deposit the solids in an adherent film on the filter. The dried filter may be calcined at from about 250° C. to about 800° C. for about 1 to about 4 hours.

The amount of the catalyst material that is coated on the filter depends on economics, size limitations, and design characteristics. The catalyst material generally comprises about 1 to about 50 and preferably from about 2 to about 30 percent based upon the weight of the filter.

During use, the catalyst composition is typically disposed so that it occupies the major part of the cross-sectional area of a housing having a gas inlet and a gas outlet. The composition typically has the general shape of the housing and is positioned in the housing with the general direction of gas flow between the inlet and outlet. The filters may be adhered together or spaced apart.

In employing the composition of this invention in the treatment of internal combustion engine exhaust gases, the gases are contacted with the composition and the lead and carbon particles are trapped in the filters. The carbon particles are combusted along with the gaseous pollutants in the exhaust gases. The accumulated carbon particulate deposits may be periodically removed by throttling the engine to reduce the air flow with fuel flow remaining constant and increase the exhaust temperature. At the resulting higher exhaust temperatures, the combustion of the particulates will be achieved quite rapidly in the presence of the catalytic filter of this invention.

In addition to the filtration of lead and/or carbon particles from internal combustion engine exhaust emissions, the filter of this invention may be used, for example, to reduce particulate emissions from other mobile power plants as well as stationary sources, such as gas turbine catalytic combustors, which utilize fuels which produce particulate pollutants.

This invention is illustrated by the following examples in which all parts and percentages are by weight unless otherwise indicated.

EXAMPLE 1

A composition of this invention which comprised the "Diesel Exhaust Catalyst" of U.S. patent application Ser. No. 153,502, filed May 27, 1980 by Ernest and Welsh and now U.S. Pat. No. 4,303,552 deposited on commercially available ceramic foam monoliths of Bridgestone Tire Co., Ltd., Tokyo, Japan was prepared as follows.

A boehmite-pseudoboehmite intermediate hydrated alumina powder prepared in accordance with the process of U.S. Pat. No. 4,154,812 of Sanchez et al. was calcined in air at 649° C. for one hour. The resulting gamma alumina had a total pore volume of 1.56 to 1.68 cubic centimeters per gram and a total volatiles content (loss in weight after heating for 1 hour at 954° C.) of 1.8 to 3.3 percent.

3000 grams of the calcined alumina powder were impregnated with 840 milliliters of a solution of 260.29 grams of chromic acetate in 840 milliliters of deionized water and 5 milliliters of glacial acetic acid. The impregnated powder was allowed to dry in air for ½ hour and then dried for 16 hours at 135° C. The powder was screened through a 20 mesh U.S. Standard Sieve and calcined at 843°–871° C. for 1 hour. The calcined chromia-alumina powder had a surface area of 107 square meters per gram and contained nominally 10 weight percent chromia.

150 grams of copper oxide freshly prepared by decomposing cupric acetate for 3 hours at 538° C. in a muffle furnace and 150 grams of the chromia-alumina powder were separately ball milled with deionized water for 16 hours. The resulting slurries were combined in a 1 to 1 ratio (solids basis) and homogenized. The pH of the combined slurry was adjusted to 3.5 with nitric acid. The procedure was repeated four times using a 1 to 1 weight ratio of the copper oxide and the chromia-alumina but varying the solids content of the slurry by adding additional water. Each slurry was coated on a Bridgestone ceramic foam monolith of 14.37 to 14.50 centimeters in diameter and 7.30 to 7.67 centimeters in length. The excess slurry was blown out of the coated monoliths and the monoliths were then dried at 135° C. for 16 hours and activated for 1 hour at 428° C. The number of cells per 25 millimeters in length of the monoliths, the solids content of the slurries, and the amounts and percentages of the catalyst material coated on the monoliths are shown in Table I.

TABLE I

| Nominal No. of cells/25 mm. | Solids Content % | Pickup-grams | % Coating |
|---|---|---|---|
| 6 | 27 | 44.4 | 9.1 |
| 13 | 23 | 45.2 | 8.1 |
| 20 | 14 | 35.9 | 6.1 |
| 30 | 14 | 41.1 | 7.7 |

Three of the 13 size monoliths and one of the 30 size monoliths were joined together and placed in a cylindrical container. The 13 size monoliths were positioned as the inlet structure, the first central section adjacent the inlet structure, and the second central structure adjacent the outlet structure and the 30 size monolith was positioned as the outlet structure. The composition was tested in the treatment of an exhaust gas from one bank (4 cylinders) of a 5.7 liter Oldsmobile diesel engine at a gas flow rate of 90 cubic feet per minute. The test was run for about 6 hours and measurements of back pressure and weight of emissions were taken approximately every hour. Good average trapping efficiency and relatively low pressure increase over the duration of the test were observed.

Another configuration was prepared in which the 6 size monoliths were positioned as the inlet section and the first and second central section and the 20 size was used as the outlet section and tested by the same method. It was found that there was a much lower pressure increase but a much lower average trapping efficiency than in the first configuration.

EXAMPLE 2

The procedure of Example 1 was repeated except that platinum and palladium were incorporated in the chromia-alumina powder as follows.

320 grams of the chromia-alumina powder of Example 1 were impregnated with a mixed solution of platinum and palladium prepared by bubbling sulfur dioxide gas at 2 millimoles per minute into 250 milliliters of deionized water for 11.0 minutes and adding 4.022 milliliters of palladium nitrate solution having a titer of 129.27 grams of palladium per liter of solution. 112.012 grams of $(NH_4)_6Pt(SO_3)_4$ solution having a titer of 92.85 grams of platinum per kilogram of solution and 3.2 grams of dibasic ammonium citrate were then added to the solution. The total volume of the solution was increased to 434 milliliters by addition of deionized water. The powder was impregnated with this volume of solution, air dried for one hour, and then oven dried for 16 hours at 135° C. The powder was finally activated in air for one hour at 538° C. The powder nominally contained 3.30 percent of platinum and palladium in a 20 to 1 weight ratio.

339 grams of the activated powder and 300 grams of freshly prepared copper oxide as in Example 1 were separately ball milled with deionized water at 28% solids content for 16 hours. The two slips were combined in a 1 to 1 ratio (solids basis) and homogenized. Other slurries were prepared using a 1 to 1 ratio of the powders but varying the solids content by adding additional water. The pH of the slurries was adjusted to 3.5 with nitric acid and the slurries were coated on Bridgestone ceramic foam monoliths of varying cell sizes. The coated monoliths were dried at 135° C. for 16 hours and then activated for one hour at 428° C. The pertinent data are shown in Table II.

TABLE II

| Nominal No. of cells/25 mm. | Solids Content % | Pickup Grams | Coating % | Grams of Platinum & Palladium |
|---|---|---|---|---|
| 6 | 28 | 47.36 | 8.7 | 0.781 |
| 6 | 28 | 43.55 | 7.6 | 0.719 |
| 13 | 23 | 46.38 | 8.5 | 0.765 |
| 13 | 23 | 46.15 | 8.4 | 0.761 |
| 20 | 16 | 44.64 | 7.5 | 0.737 |
| 20 | 16 | 43.98 | 7.5 | 0.726 |
| 30 | 14 | 45.62 | 8.7 | 0.753 |
| 30 | 14 | 43.09 | 7.4 | 0.711 |

The monoliths may be joined in the configurations of Example 1 and used in the treatment of diesel exhaust gases.

What is claimed is:

1. A method for removing carbon and lead particles from internal combustion engine exhaust gases comprising passing the gases through a coarse ceramic foam filter having a pore size of from about 2 to about 20 pores per 25 millimeters in length and then through a fine ceramic foam filter having a pore size of from about 15 to about 50 pores per 25 millimeters in length.

2. The method of claim 1 in which the coarse filter has a pore size off from about 6 to about 20 pores per 25 millimeters in length and the fine filter has a pore size of from about 17 to about 30 pores per 25 millimeters in length.

3. The method of claim 1 in which the filters further comprise a carbon combustion catalyst material deposited on the filters.

4. The method of claim 3 in which the catalyst material comprises a noble metal, an element of the first transition series, hafnium, or mixtures thereof.

5. The method of claim 3 in which the catalyst material comprises a mixture of catalytically-effective amounts of at least one supported material selected from the group consisting of a noble metal, chromium, and catalytically-active compounds thereof, said material supported on a porous refractory inorganic oxide, and at least one bulk material selected from the group consisting of an element of the first transition series, silver, hafnium, and catalytically-active compounds thereof.

* * * * *